Oct. 14, 1958   J. J. SPICER, JR   2,856,482
VEHICLE TURN INDICATING EQUIPMENT
Original Filed Aug. 25, 1955   2 Sheets-Sheet 1

INVENTOR
John J. Spicer Jr.
BY
Synnestvedt & Lechner
ATTORNEYS

Oct. 14, 1958   J. J. SPICER, JR   2,856,482
VEHICLE TURN INDICATING EQUIPMENT
Original Filed Aug. 25, 1955   2 Sheets-Sheet 2
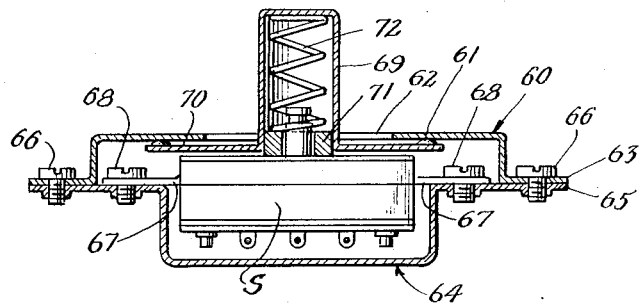
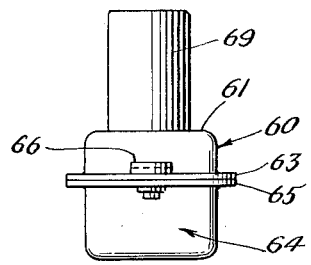
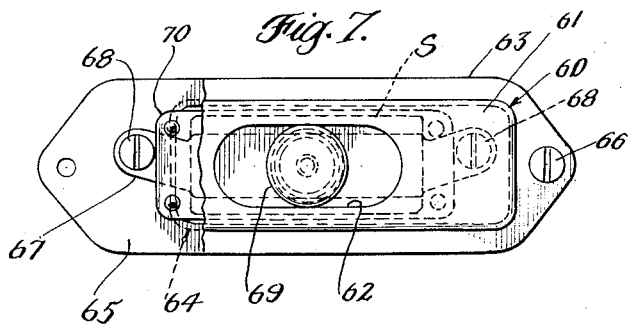
INVENTOR
John J. Spicer Jr.
BY
Synnestvedt + Lechner
ATTORNEYS

United States Patent Office 2,856,482
Patented Oct. 14, 1958

2,856,482

VEHICLE TURN INDICATING EQUIPMENT

John J. Spicer, Jr., Philadelphia, Pa., assignor, by mesne assignments, to United Specialties Company of Illinois, a corporation of Delaware Original application August 25, 1955, Serial No. 530,556. Divided and this application November 22, 1957, Serial No. 698,292

1 Claim. (Cl. 200—86.5)

This invention relates in general to vehicle turn indicating equipment and, in particular, relates to means actuable by an operator to initiate a turn signal. This application is a division of my copending application Serial No. 530,556, filed August 25, 1955, now Patent No. 2,846,533 issued August 5, 1958.

Many vehicles such as passenger cars and trucks are provided with mechanism adapted to flash signal lights on the front and rear of the vehicle when a turn is to be made either in the left or right-hand direction. Such equipment may include in general certain electrical components making up the circuits of the system, a switch for interconnecting certain of the circuits to cause the desired flashing, together with mechanical means actuable by the driver to operate the switch. The present invention is concerned with the latter mentioned portion of such equipment and, in its preferred form, is concerned with the combination of a switch and the means for actuating the same. The apparatus of the invention is adapted to be actuated by the foot of the vehicle operator and is of the non-self-cancelling type.

It is one object of the invention to provide for a vehicle turn indicating system, a signal initiating device to be connected with the floor board of a vehicle and actuated by the foot of an operator, the device having a structure adapted to protect a switch associated therewith from contact with foreign matter often times present in and about the vehicle floor board.

Another object of the invention is to provide for a vehicle turn indicating system, a strong, rugged, foot-operated signal initiating device whose parts can be made by drawing and stamping operations and, therefore, be inexpensive to produce.

Certain other objects and advantages of the invention will be apparent from the following description and drawings wherein:

Figure 5 is a longitudinal section of a modification;

Figure 6 is an end view of Figure 5;

Figure 7 is a plan view of Figure 5.

Figure 1:
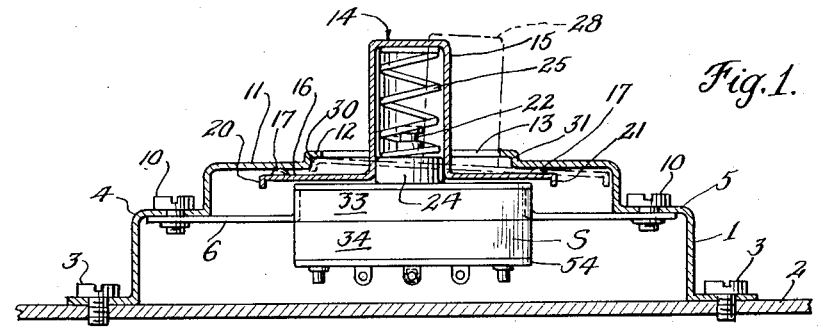
Figure 1 is a longitudinal section taken on the line 1—1 of Figure 2 with the device appearing in elevation.

In Figure 1 I have shown a housing 1 which is adapted to be secured to the floor board 2 of a vehicle as by the screws 3—3 and has shoulders 4 and 5, to which is secured a bracket 6 as by the screws 10—10. The bracket 6 is adapted to support a switch S.

The top portion 11 of the housing is substantially flat, the central part 12 thereof being raised and provided with an elongated slot 13. It will be observed that the housing 1, as mounted on the floor board, is entirely closed except for the slot 13.

An actuating member generally indicated by 14 has a hollow post 15 disposed in the slot 13 and a substantially flat slider portion 16 having bosses 17—17 bearing against the underside of top portion 11. The opposite ends of the slider are bent downwardly as indicated at 20 and 21.

Figure 4:
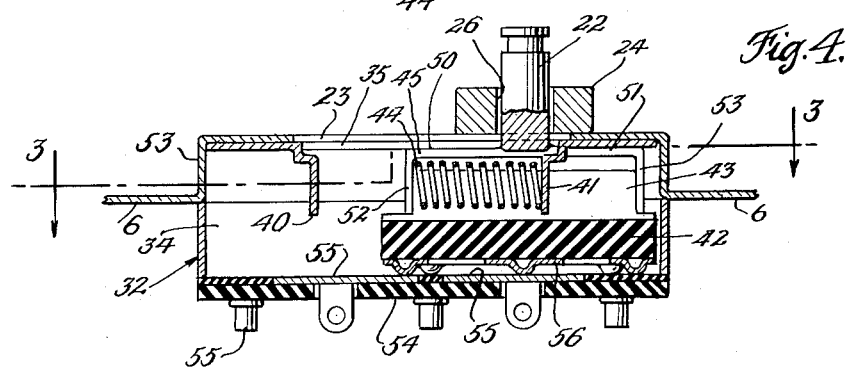
Figure 4 is a longitudinal section taken on the line 4—4 of Figure 3.

The switch S has an operating stud 22, which extends through an elongated slot 23 in the bracket 6 (Figure 2) and upwardly (Figure 1) into the hollow post 15. A washer 24 disposed over the stud 22 rests on the bracket 6 and is disposed at the mouth of the hollow post 15. A spring 25 bears between the washer and the top of the post 15 and operates to urge the slider portion 16 up against the top portion 11 of the housing. The purpose of the washer is to transmit motion as between the stud and post and to provide a bearing surface for the spring. As indicated in Figure 4, the hole 26 in the washer which receives the stud is somewht oversized to provide for a slight tipping motion of the washer, as is indicated by the numeral 27 in Figure 8.

As will be commented on more in detail later, the position of the stud 22 controls the manner in which the switch S operates to interconnect circuits of the turn indicating system. When the stud is moved to the left or right as viewed in Figure 1, the switch effects the flashing of lights to indicate a left turn or a right turn as the case may be. The stud may be moved to the left or right by movement of the post. In Figure 1 the post 15 is shown in a neutral or center position and is adapted to be engaged by the foot of the operator and moved to the left or right for the purpose of initiating the desired turn signal.

When the post is moved, say, to the right as indicated in Figure 1 by the dotted lines 28, the bent over portion 20 of the slider 16 is forced upwardly by the spring 25 into the detent or recess 30 provided by the raised portion 12. When the post is moved to the left, the bent over portion 21 engages the detent or recess 31. In either position, the post is releasably held in position and the foot may be disengaged from the post. When the turn is completed and the post is to be returned to neutral, the top of the post is slightly depressed with the foot, which moves the bent over portion out of its corresponding detent and the post is automatically returned to neutral as is explained following.

The portion of the housing just above the ledges 4 and 5, together with the bent over portions 20 and 21, can be arranged to accommodate return springs respectively disposed therebetween. I prefer, however, that the return spring or springs be an integral part of the switch S. One type of switch ideally suited for such a purpose is disclosed in my copending application, now abandoned, Serial No. 352,481, filed May 1, 1953, entitled, Switch for an Automobile Turn Indicating System, and assigned to the assignee of the present invention. This switch will be described briefly below for an understanding of its return operation.

Figure 2:
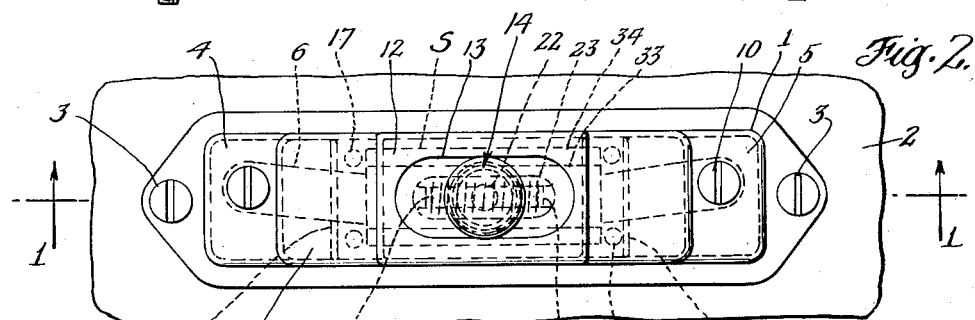
Figure 2 is a plan view of Figure 1.
Figure 3:
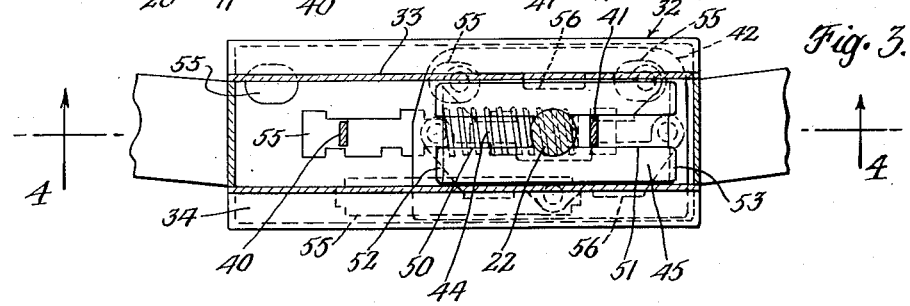
Figure 3 is an enlarged plan section of the switch unit of the device as taken on the line 3—3 of Figure 4.

As seen in Figures 3 and 4, the switch has an enclosure or a housing 32 channel-shaped in cross section with the upper part 33 being narrower than the lower part 34 (also see Figure 2). The top of the housing has an elongated slot 35 which, as seen in Figure 4, is just below the slot 23 in the bracket 6. Both of these slots accommodate the stud 22 and also expose the interior of the switch. At the opposite ends of the slot 35 are abutments 40 and 41. Within the housing is a carrier 42 having a slot 43 in which is disposed a spring 44. When the switch is in neutral position (centered as between the abutments 40 and 41), the spring is expanded and bears on these abutments. On the top of the carrier is a slider 45, to which is secured the stud 22. The slider has slots 50 and 51 which permit it to be moved past either abutment 40 or 41. The ends of the slider are arranged to overlie the ends of the carrier and the ends of the spring as indicated at 52 and 53 in Figure 3.

When the stud 22 is moved to the right, the left-hand end of the slider pulls the carrier to the right and grabs the spring and compresses the same against the abutment 41. This is shown in Figure 4. The slider moves past the abutment 41 by virtue of the slot 51 and the carrier also moves past this abutment by virtue of the slot 43. In this position, if the force on the stud 22 is released, the spring 44 will cause the slider, stud and carrier to move back to the neutral or center position. The same type of action obtains if the stud is moved from neutral to the left-hand side.

The housing 34 of the switch is provided with an insulated base 54, which has a plurality of fixed terminals generally indicated by the numerals 55. As seen in Figure 4, these fixed terminals are generally flush with the one side of the base and extend therethrough to the outside, where they are adapted to be connected to the various circuits making up the turn indicating system. The carrier is provided with bridging contacts generally indicated by the numerals 56—56. As fully explained in the above-mentioned copending application, when the switch is in the neutral position, the bridging contacts interconnect certain of the fixed terminals, and when the switch is moved to either the left or right settable position, the bridging contacts interconnect certain of the fixed terminals for the purpose of indicating a turn signal.

As has been mentioned heretofore, it is important in foot-operated turn signal devices to keep foreign matter out of the switch associated therewith in order to prevent the switch contacts being rendered wholly or partially inoperative or the switch otherwise damaged. The above-described structure accomplishes this objective, as will be apparent from the following.

The bosses 17—17 on the slider 16 are shown somewhat exaggerated in size and, in practice, are made relatively small, for example, in the order of a few thousandths of an inch, so that the slider is just slightly spaced from the underside of the portion 11. The slider is kept in the spaced condition by the action of spring 25. Also, the extent to which the raised portion 12 protrudes outwardly from the portion 11 is somewhat exaggerated. The foregoing arrangement, although providing for movement of the slider and post, makes for a close fit between the top of the slider and the underside of the portion 11. Further, it will be apparent from an inspection of Figure 2 that the slider portion covers an area much greater than that of the switch and, more particularly, that of the slot 35, which exposes the interior of the switch.

The close fit between the slider 16 and the portion 11 as above mentioned provides an arrangement which is highly resistant to the entry of dust or dirt. Coupled with this is the fact that the slider portion forms a protective area about the slot 23. Thus, even if foreign matter found its way through the space between the slider and the portion 11, it would merely drop into the housing 1 and be prevented from dropping into the slot 23 due to the protective cover of the slider.

In Figures 5, 6 and 7 I have shown an embodiment which is adapted to fit in a recess into the floor board of the vehicle, and in which the detenting means for holding the switch in a settable position are not used.

The switch has a housing 60, the top portion 61 of which is substantially flat and has an elongated slot 62. The housing also is provided with a peripheral lip 63. Another housing 64 has a peripheral lip 65, which is connected with lip 63 as by the screws 66—66 and also mounts the bracket 67 supporting the switch S, the bracket being secured as by the screws 68—68, which may be adapted to secure the unit to the vehicle floor board. The actuating member for the switch includes the post 69 and slider 70, together with the washer 71 and spring 72, which are arranged similarly as heretofore described.

In this embodiment, when the post 69 is moved to the left- or right-hand position to energize the respective lights for indicating a turn, the foot must remain in contact with the post until the turn is completed. Then the foot is released and the switch returns to neutral position in a manner previously described.

I claim:

A foot-operated device for a vehicle turn signal system comprising: a first housing, one side of which is open, a lip extending around the opening and the side opposite the opening being substantially flat and having an elongated slot; a second housing, one side of which is open, a lip extending around the opening and the respective lips of the two housings engaging one another; a turn signal control switch mounted in said housings and including an enclosure and a movable member adapted to be moved as between a neutral and two turn indicating positions and having an operating stud connected therewith; an actuating member for the switch comprising a hollow post extending outwardly through said slot to be contacted by the foot of the vehicle operator and a substantially flat slider portion slidably engaging the underside of first said flat side, the slider having an area larger than said slot whereby to close said slot when the movable member is in any of said positions and the switch being disposed beneath the slider whereby the slider forms a protective cover therefor; a washer disposed on said stud slidably engaging said enclosure and extending into and engaging said hollow post; and a spring in said hollow post and bearing on said washer and said post and urging said slider portion into said engagement.

References Cited in the file of this patent

UNITED STATES PATENTS

| | | |
|---|---|---|
| 2,374,873 | McDonald, Jr. | May 1, 1945 |
| 2,425,985 | Bloomberg | Aug. 19, 1947 |
| 2,464,184 | Pierce | Mar. 8, 1949 |
| 2,528,115 | Clayton | Oct. 31, 1950 |
| 2,550,145 | Geci | Apr. 24, 1951 |